(12) United States Patent
Singh et al.

(10) Patent No.: US 10,822,184 B2
(45) Date of Patent: Nov. 3, 2020

(54) APPARATUSES FOR PRECISION LOADING OF PACKAGES FOR LAST-MILE AUTONOMOUS DELIVERY

(71) Applicant: Ford Global Technologies, LLC, Dearborn, MI (US)

(72) Inventors: Aditya Singh, Redwood City, CA (US); James Carthew, Oakland, CA (US); Weifeng Xiong, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 16/252,501

(22) Filed: Jan. 18, 2019

(65) Prior Publication Data

US 2020/0231392 A1 Jul. 23, 2020

(51) Int. Cl.
*B65G 61/00* (2006.01)
*B64D 1/22* (2006.01)
*B64C 39/02* (2006.01)

(52) U.S. Cl.
CPC .......... *B65G 61/00* (2013.01); *B64C 39/024* (2013.01); *B64D 1/22* (2013.01); *B64C 2201/128* (2013.01)

(58) Field of Classification Search
CPC combination set(s) only.
See application file for complete search history.

(56) References Cited

U.S. PATENT DOCUMENTS

| | | | |
|---|---|---|---|
| 8,862,288 B2 | 10/2014 | Vavrina et al. | |
| 9,527,605 B1 | 12/2016 | Gentry et al. | |
| 2016/0090248 A1* | 3/2016 | Worsley | B65G 61/00 414/398 |
| 2017/0129603 A1 | 5/2017 | Raptopoulos et al. | |
| 2017/0132562 A1 | 5/2017 | High et al. | |
| 2017/0316701 A1 | 11/2017 | Gil et al. | |
| 2018/0155028 A1* | 6/2018 | Gil | B64C 39/024 |
| 2018/0194490 A1* | 7/2018 | Chen | B64D 47/08 |

(Continued)

FOREIGN PATENT DOCUMENTS

DE 102016007467 A1 2/2017

OTHER PUBLICATIONS

Murphy, M., "Put a drone on it: Mercedes made a crazy van with built-in drones and robot arms to deliver the packages of tomorrow," Quartz, Jan. 6, 2017 (5 pages). Retrieved from https://qz.com/879605/mercedes-made-a-crazy-van-with-built-in-drones-and-robot-arms-to-deliver-the-packages-of-tomorrow/.

*Primary Examiner* — Kyle O Logan
(74) *Attorney, Agent, or Firm* — Brandon Hicks; Eversheds Sutherland (US) LLP

(57) ABSTRACT

Apparatuses for precision loading of packages for last-mile autonomous delivery are provided herein. An example apparatus includes a base; a platform rotatably supported on the base, the platform comprising at least one slot; an armature configured to protrude through the at least one slot when the at least one slot has been aligned with the armature through rotation of the base; a translating member that is configured to traverse above and across an upper surface of the platform; and a controller having at least one processor coupled to at least one memory, the controller being configured to place a package on the platform into a selected orientation through selective control of at least one of rotation of the platform, extension of the armature, translation of the translating member, or combinations thereof.

20 Claims, 7 Drawing Sheets

(56) References Cited

U.S. PATENT DOCUMENTS

| | | | | |
|---|---|---|---|---|
| 2018/0356823 A1* | 12/2018 | Cooper | ............... | G05D 1/0202 |
| 2019/0143872 A1* | 5/2019 | Gil | .......................... | B60P 3/007 |
| | | | | 211/86.01 |
| 2019/0220811 A1* | 7/2019 | Naito | ............... | G06Q 10/08355 |
| 2020/0207250 A1* | 7/2020 | Jarvis | .................. | G01C 21/343 |
| 2020/0209865 A1* | 7/2020 | Jarvis | .................. | G05D 1/0212 |

* cited by examiner

APPARATUSES FOR PRECISION LOADING OF PACKAGES FOR LAST-MILE AUTONOMOUS DELIVERY

TECHNICAL FIELD

The present disclosure relates to apparatuses and devices that provide for precise manipulation and orientation of packages by autonomous vehicles, such as unmanned aerial vehicles (UAVs). In some embodiments, the UAVs operate in conjunction with delivery vehicles.

BACKGROUND

Last-mile package delivery often involves the use of delivery vehicles to endpoint locations such as businesses or homes. While the use of autonomous vehicles, and in some instances UAVs, can assist in completing last-mile deliveries, drawbacks exist. Enabling autonomous UAV package delivery requires implementing a means for the UAV to collect a package and carry it during transit. Sophisticated grasper mechanisms (such as multi-degree of freedom (nDOF) robotic arms) can be used to collect a package regardless of its orientation. The nDOF mechanisms are not appropriate for UAV applications because they are unnecessarily heavy and require complex and expensive manufacturing. Also, the package may not be in an ideal orientation for UAV pickup.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Generally described, the present disclosure is directed to, in some embodiments, apparatuses that are configured to reorient a package into a selected position or orientation through mechanical or physical manipulation of the package. In some embodiments, these apparatuses are configured to place the package into an orientation that allows an unmanned aerial vehicle (UAV) having a single degree of freedom (DOF) payload assembly to pick up the package for last-mile delivery (or other similar applications).

An example simple UAV payload assembly possesses a single DOF allowing for relatively simple mass manufacturing (relative to an nDOF mechanism), in addition to being light enough to be mounted on a UAV without impacting flight dynamics or duration. Variations upon this simplistic design share a similar problem. For a single DOF mechanism to securely pick up a package, the orientation of the package should ideally be absolute. For example, a package can be oriented with a particular surface facing the UAV and be placed on a particular location or general area of a platform within a delivery vehicle.

The delivery vehicle can comprise a specific package storage and conveyance apparatus or assembly used to move packages from a storage location within the delivery vehicle into a position for UAV collection. In some embodiments, this can be achieved using a conveyor mechanism or a series of ramps, flippers, and bumpers—or combinations thereof. However, once the package is in the vicinity of the UAV, it will likely not be in a correct or predetermined orientation for secure collection by a single DOF mechanism mounted on the UAV.

Also, UAV package delivery is dependent on a ground transport unit (e.g., delivery vehicle) that carries the bulk of the packages and operates as a "portable warehouse" for the UAV.

In some embodiments, one of the apparatuses of the present disclosure is installed within the delivery vehicle. The apparatus can include a mechanism (or a combination of mechanisms) which automatically orients and centers a package for collection by a UAV, such that the label (e.g., delivery label) can be read by a camera or other reader device of the UAV. The apparatus can orient and center a package for collection via a UAV with a low complexity grasping mechanism.

The apparatuses disclosed herein are intended for use in an autonomous UAV delivery and may be mounted in a back area of a transit van that is driving a delivery route in which a UAV is utilized for front door delivery. In some embodiments, a package for delivery is removed from the delivery vehicle storage area via a conveyer belt system or slide that then places the package in an apparatus of the present disclosure which in turn manipulates the package into a desired orientation/position for UAV pickup and delivery. These and other aspects and advantages of the present disclosure are described in greater detail herein with reference to the collective drawings.

Figure 1:
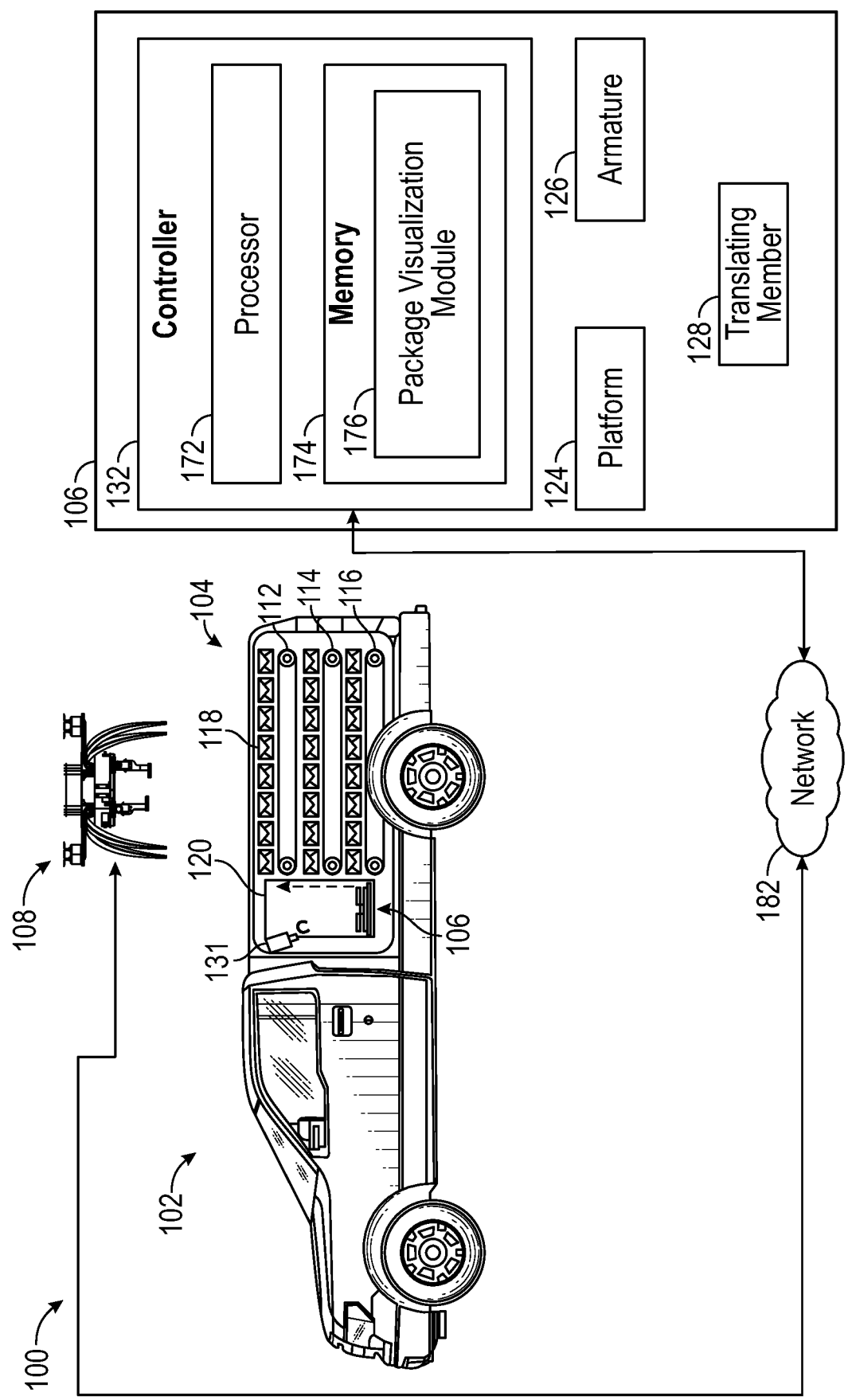
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a delivery vehicle 102 having a package storage and conveyance assembly 104, as well as a package manipulating apparatus 106 (hereinafter apparatus 106). The architecture 100 also comprises a UAV 108 that delivers packages to a last-mile endpoint such as a home.

The delivery vehicle 102 can include a legacy vehicle or an autonomous vehicle. In one or more embodiments, the package storage and conveyance assembly 104 can comprise a plurality of levels of package storage. Each of the plurality of levels of package storage comprises a conveyor such as conveyors 112, 114, and 116. Thus, a plurality of vertically stacked conveyors are present in a rear area of the delivery vehicle 102. In an example embodiment, the conveyor 112 is configured to deliver a package, such as package 118, from the package storage to the apparatus 106.

This configuration allows for stacks of parcels to be loaded into the back of the van in the order they are to be delivered in. The parcels are loaded onto conveyor belts. The apparatus 106 can move to the level of each conveyor belt to receive a package and then move it to underneath the UAV 108. Alternative designs could utilize unordered pigeon holes for packages with slides and doors to select and release the desired package for delivery.

In some embodiments, the delivery vehicle 102 comprises an elevator assembly 120. In various embodiments, the apparatus 106 is disposed on the elevator assembly 120. The elevator assembly 120 is configured to align the apparatus 106 with any of the conveyors 112, 114, and 116. For example, the elevator assembly 120 can vertically translate the apparatus 106 into alignment with the conveyor 112. The package 118 can be transported to the apparatus 106 when the apparatus 106 is aligned with the conveyor 112.

After manipulation to place the package 118 into a desired orientation through operation of the apparatus 106, the elevator assembly 120 can move the package 118 on the apparatus 106 into a pickup position. For example, the elevator assembly 120 can elevate the package 118 upwardly and outwardly from a roof of the delivery vehicle 102 in some embodiments. This places the package 118 in a location and orientation for pickup by the UAV 108. The elevator system described herein can be utilized in other apparatus embodiments, such as the apparatus 300 of FIG. 5.

Figure 2A:
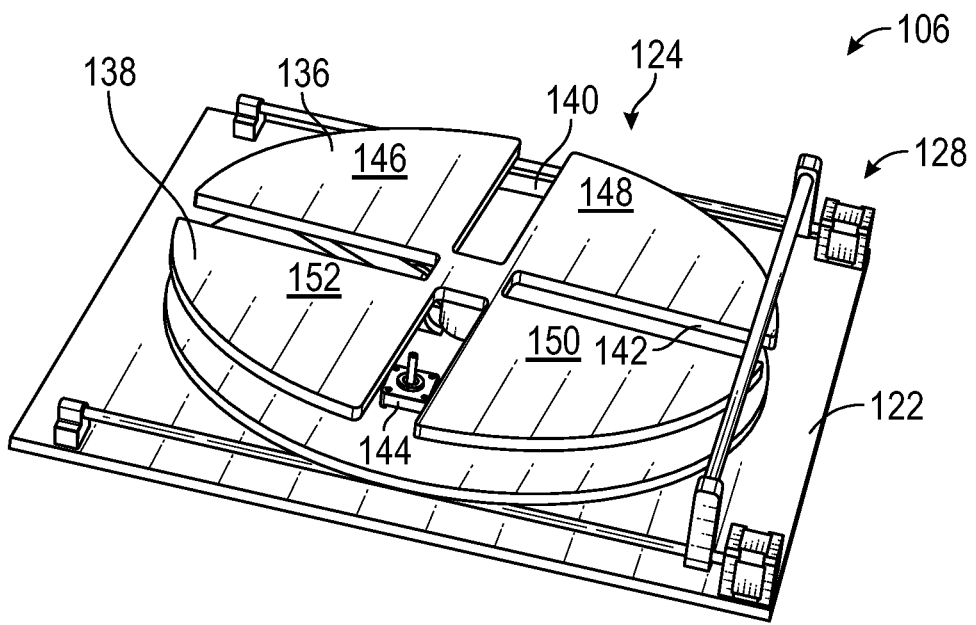
FIGS. 2A and 2B collectively illustrate an example apparatus of the present disclosure.
Figure 2B:
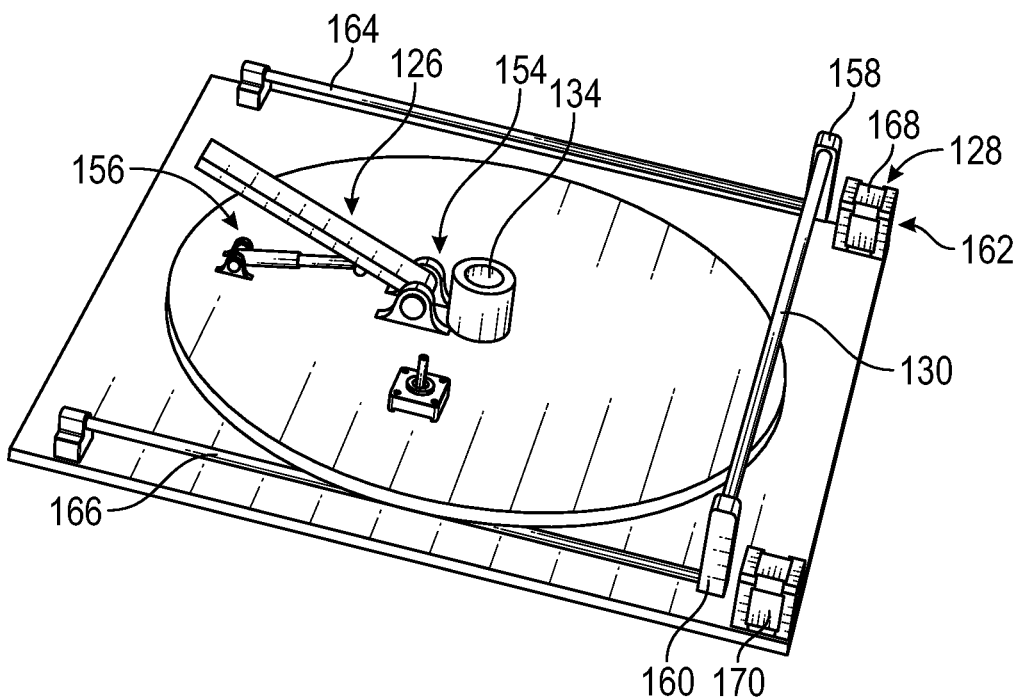

FIGS. 1, 2A and 2B collectively illustrate perspective views of the example apparatus 106. In various embodiments, the apparatus 106 comprises a base 122, a platform 124, an armature 126, a translating member 128, a camera 131 (FIG. 1), and a controller 132 (see FIG. 1). In one or more embodiments, the base 122 comprises a planar substrate upon which components of the apparatus 106 are mounted. In one embodiment, the platform 124 can be rotatably supported on the base 122. In some embodiments, the platform 124 is rotated using a motor (not shown). In various embodiments, the platform 124 is mounted on a post 134 that is aligned with a center point of the base 122. The motor that rotates the platform 124 can be controlled through use of the controller 132. Details on the controller 132 will be discussed in greater detail infra.

The platform 124 has an upper surface 136 upon which a package sits. The platform 124 can include a plurality of slots such as slots 138, 140, 142, and 144 that can receive the armature 126. The platform 124 is rotated to align the armature 126 with one slot at a time. In some embodiments, fewer or additional slots can be incorporated into the platform 124. In some instances, the slots subdivide the platform 124 into sectors 146, 148, 150, and 152. In one or more embodiments, the sectors 146, 148, 150, and 152 can each be coated (partially or completely) with a high-friction coating such as a rubber, linoleum, or other similar material. In general, the coating provides package impact damping and provides a high coefficient of friction to ensure that any package on the platform 124 does not move excessively across the upper surface 136.

The armature 126 is pivotally coupled to the base 122 through a pair of brackets 154. The armature 126 can be pivotally translated using an actuator 156. In some embodiments, the actuator 156 can include a piston that is actuated through use of the controller 132 as will be discussed in greater detail infra. In general, the armature 126 is used to flip the package 118 from one package surface to another package surface. To be sure, the apparatus 106 can comprise additional armatures. Thus, in one embodiment, each slot of the platform 124 is associated with a corresponding armature. The use of multiple armatures can reduce or eliminate the need for rotating the platform 124.

In various embodiments, the translating member 128 comprises an elongated member 130 that is suspended between posts 158 and 160 of a rail assembly 162. In general, the rail assembly 162 also comprises two lead screws 164 and 166. In one embodiment, post 158 is associated with lead screw 164 and post 160 is associated with lead screw 166. Each of the lead screws 164 and 166 are associated with a motor. For example, the lead screw 164 is associated with a first motor 168, and the lead screw 166 is associated with a second motor 170. In various embodiments, the first motor 168 and the second motor 170 are stepper motors that apply a torque force to their respective lead screws. Thus, when the first motor 168 is activated, it turns the lead screw 164 which drives the post 158 along the lead screw 164 causing the elongated member 130 to translate horizontally and across the upper surface 136 of the platform 124.

When the second motor 170 is activated, it turns the lead screw 166 which drives the post 160 along the lead screw 166 causing the elongated member 130 to translate horizontally and across the upper surface 136 of the platform 124. In some embodiments, only the first motor 168 or the second motor 170 is utilized. In some embodiments, both the first motor 168 and the second motor 170 are utilized. In various embodiments, the controller 132 can be used to activate either or both of the first motor 168 and the second motor 170. When the package 118 is light, it may require only the use of one motor. Conversely if the package 118 is heavy, it may require the use of both motors. In various embodiments, the apparatus 106 can include a weight sensor that allows the controller 132 to determine if one or both motors should be used. Also, in one or more embodiments, only one motor and post are utilized, and the elongated member 130 is cantilevered from the post.

In general, the translating member 128 is actuated through use of the controller 132 as will be discussed in greater detail infra. In general, the translating member 128 is used to push the package 118 along the upper surface 136 of the platform 124 to re-center the package 118 on the platform 124. Also, the translating member 128 can be used to push the package 118 into proximity to the armature 126, which allows the armature 126 to flip the package 118. Combinations of flips, pushes, and platform rotations can be used to expose any surface of the package to a camera (discussed infra).

In various embodiments, the controller 132 comprises a processor 172 and a memory 174 (see FIG. 1). In some embodiments, the controller 132 is configured to selectively control operation of each of the platform 124, the armature 126, and the translating member 128 to manipulate the package 118 into a predetermined/selected orientation. In various embodiments, the controller 132 can selectively control more than one of the platform 124, the armature 126, and the translating member 128 at a time to effect a change in position, orientation, or the like. For brevity, the platform 124, the armature 126, and the translating member 128 are collectively referred to as manipulating elements.

In various embodiments, the controller 132 uses the manipulating elements to perform package flipping where the package 118 is flipped from having a first package surface facing upwardly to a second package surface that faces upwardly. This flipping operation can be performed multiple times in combination with other manipulations. The controller 132 can also use the manipulating elements to move the package 118 from a position on the platform 124 to a different position on the platform 124. The controller 132 can also use the manipulating elements to rotate the package 118. An example sequence of package manipulation operations is illustrated with respect to FIG. 4.

In various embodiments, to assist with package manipulation, the camera 131 can be utilized to obtain images of the package 118. In one or more embodiments, the camera 131 provides images to the controller 132 for analysis. The controller 132 can include a package visualization module 176 that is configured with computer vision algorithms that are used to identify package surfaces and/or indicia on a package surface.

In general, the controller 132 executes the package visualization module 176 to evaluate images of the package 118 to determine a location of the package 118 relative to the platform 124 as well as a current orientation of the package 118. A current orientation can be determined by assessing which surface/side of the package 118 is currently upwardly facing. Also, the package visualization module 176 can be used to evaluate the dimensions of the package 118.

In some instances, the package visualization module 176 is configured to identify markings present on the package 118, such as an orientation marker that indicates which side of the package 118 is facing upward. According to some embodiments, each surface of the package 118 is provided with unique indicia that can be read using the package visualization module 176.

In one or more embodiments, the package visualization module 176 also evaluates the images obtained by the camera 131 to determine a delivery label 180 (see FIG. 4) on the package (a specific type of indicia). In various embodiments, a desired orientation for the package 118 is achieved when the delivery label 180 is placed facing upward. In other embodiments, the desired orientation is achieved when the delivery label 180 is facing upward and rotated into a certain orientation using the platform 124.

According to some embodiments, such as when the package 118 is a six-sided package, the controller 132 can manipulate the package 118 a plurality of times to obtain images of each surface of the package 118. To be sure, for a conventional six-faced package, a maximum of five flips is required, and the controller 132 is configured to utilize a preprogrammed sequence of rotations and flips to expose the surfaces of the package 118 to the camera 131. In other embodiments, the controller 132 manipulates the package 118 until a side comprising the delivery label 180 is facing upward and is identified by the controller 132. An example preprogrammed sequence of rotations and flips is illustrated in FIG. 3.

Figure 3:
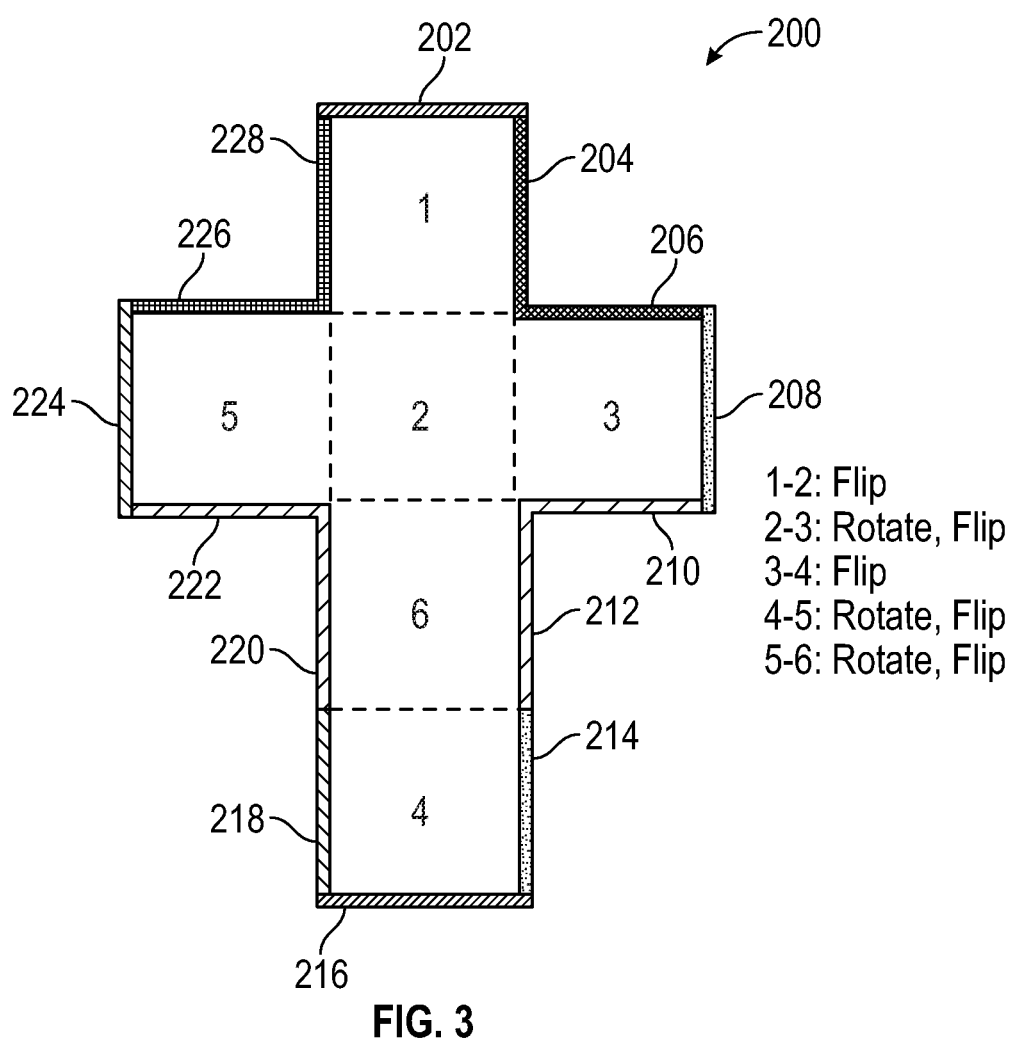
FIG. 3 illustrates a pattern of package manipulations performed by an apparatus of the present disclosure.

With collective reference to FIGS. 1 and 3, a pattern 200 comprises a plurality of edges such as edges 202-228. Each of the edges of the pattern 200 corresponds to a respective surface of an example six-sided package. The package is not illustrated in this view so as to prevent obscuring of the pattern 200. Each of the edges has been cross-hatched and matching hatching patterns indicate that the same package surface is being illustrated. The pattern 200 is also numbered with locations 1-6, each of which represent manipulation(s) of the package. In some embodiments, a package is moved from locations 1 to 2 using a flip manipulation. This process would result in edge 202 being upwardly facing in location 2, for context.

The package can be moved from locations 2 to 3 using a platform rotation and a flip manipulation. The package can be manipulated from locations 3 to 4 by flipping the package again. The package can be moved from locations 4 to 5 using a platform rotation and a flip manipulation, and then from locations 5 to 6 using a platform rotation and a flip manipulation.

During each of the movements described above, the translating member 128 can be used to push the package into proximity with the armature 126 to enable flipping manipulations. The translating member 128 and rotation of the platform 124 can also be used to re-center the package in an instance where the package unintentionally slides or moves on the platform. Unintentional movement of the package could occur due to vehicle movement, for example. Pushing and rotation can also be used to move the package into position with the armature 126 after a flip manipulation.

In some embodiments, the desired orientation of the package includes placing the package 118 onto any surface that allows the UAV 108 to pick up the package without regard to the delivery label. For example, if the package is oblong, the UAV 108 may not be able to pick up the package 118 due to the dimensions of the surface. Thus, the controller 132 manipulates the package 118 so that a package surface that is contacted by the UAV 108 can be grabbed by the armatures of the UAV 108. This could include ensuring that a package surface with a smaller dimension is placed upwardly. Thus, the controller 132 can manipulate the package 118 for UAV pickup based on package dimensions rather than (or in addition to) delivery label orientation. Delivery details can be otherwise obtained by the UAV 108 through means such as passive or active RFID tags in the package or from inventory management mediated by the controller 132.

Thus, in some instances, the controller 132 can control operation of the conveyors 112, 114, and 116 to deliver packages to the apparatus 106. When the packages are in an ordered storage configuration which can be correlated with a delivery address, the controller 132 can transmit this delivery address data to the UAV 108 over the network 182 or a short-range wireless connection.

According to some embodiments, a camera can be mounted on the base 122 of the apparatus 106. For example, the camera can be oriented to align with a slot location of the slots of the platform 124. In other embodiments, the camera can be positioned above the upper surface 136 of the platform 124 as illustrated in FIG. 1. In some embodiments, more than one camera can be utilized to increase package surface identification.

Additional and optional features for the apparatus 106 can include a lip or an edge integrated into the platform 124. For example, a lip can protrude orthogonally (or substantially orthogonally at an angle that is not exactly 90°) from a terminal edge of the platform 124 to prevent the package 118 from falling off of the platform 124. In one or more embodiments, the slots 138, 140, 142, and 144 of the platform 124 can be provided with a rubber seal and/or washers that prevent the package 118 (or a portion thereof) from being caught therein and becoming stuck or tearing the package 118.

In one or more embodiments, the controller 132 of the apparatus 106 is configured to communicate with the UAV 108 through a network 182. The network 182 may include any one or a combination of multiple different types of networks, such as cable networks, the Internet, cellular networks, wireless networks, and other private and/or public networks. In some instances, the network 182 may include cellular, Wi-Fi, or Wi-Fi direct. In some embodiments, the controller 132 can communicate with the UAV 108 over the network 182 to indicate that the package 118 is ready for pickup and delivery. In one example embodiment, the UAV 108 can comprise a camera (see FIG. 7), and the UAV 108 can hover over the package 118 and obtain the images of the package 118 that are used by the controller 132 to identify package surfaces and manipulate the package into the desired orientation.

Figure 4:
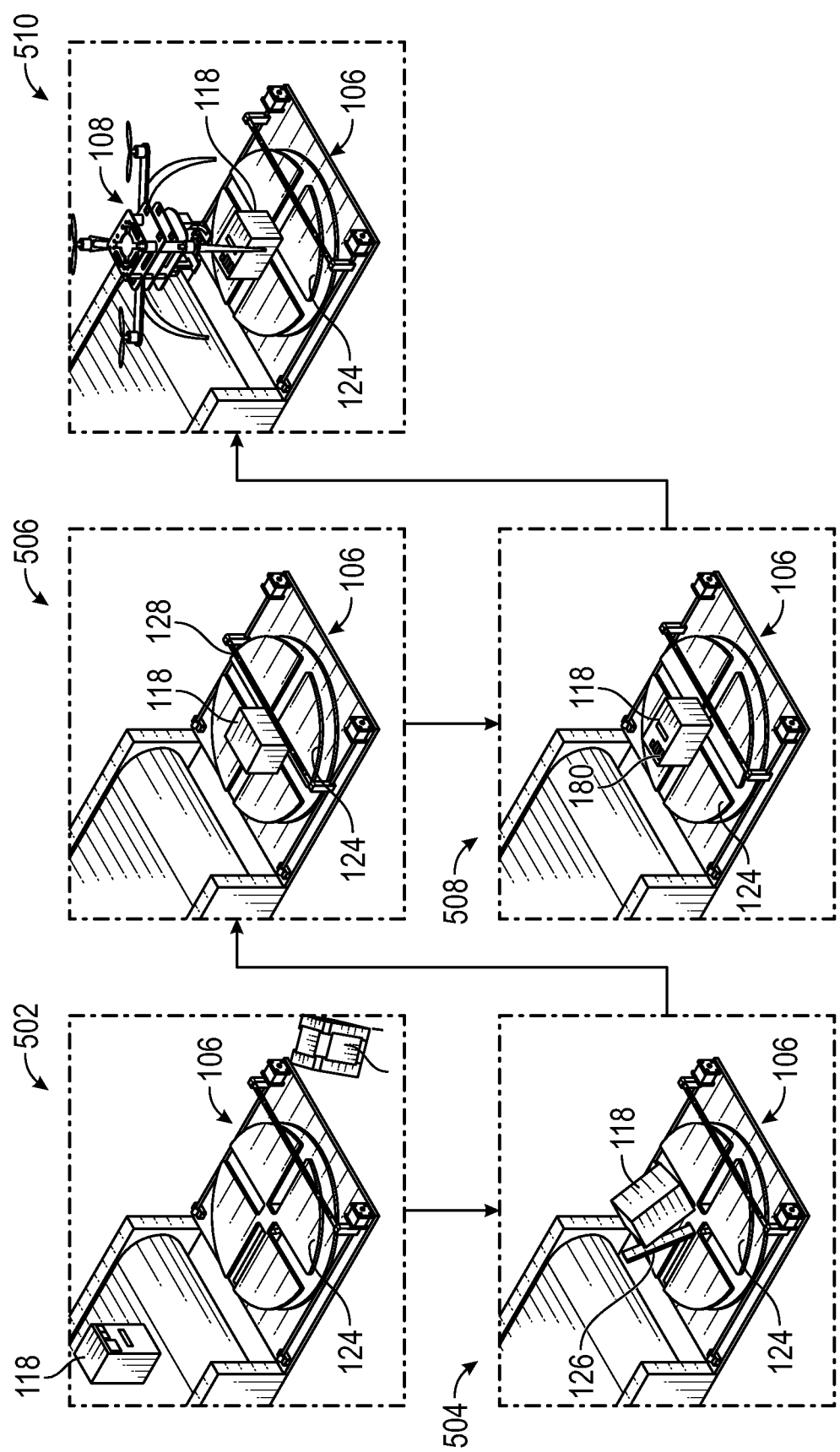
FIG. 4 illustrates a progressive sequence of package manipulations performed by an apparatus of the present disclosure.

Referring now to FIGS. 1 and 4, a sequential flow of manipulations of a package 118 using the apparatus 106 is collectively illustrated. In sequence part 502, the package 118 is moved along a conveyor to the apparatus 106. In sequence part 504, the package 118 is manipulated by the armature 126 to flip the package 118. Sequence part 506 illustrates the translating member 128 pushing the package 118 into a position where it can be flipped a second time. Sequence part 508 illustrates the package 118 in an orientation where the delivery label 180 is facing upwards. Sequence part 510 illustrates the package 118 in a post-rotated orientation as compared to sequence part 508. That is, the platform 124 has been rotated from sequence part 508 to sequence part 510. The UAV 108 picks up the package 118 when the package 118 is in the selected or predetermined orientation. As noted above, not every possible manipulation of the package 118 has been illustrated for purposes of brevity, and it will be understood that multiple manipulations can occur simultaneously.

Figure 5:
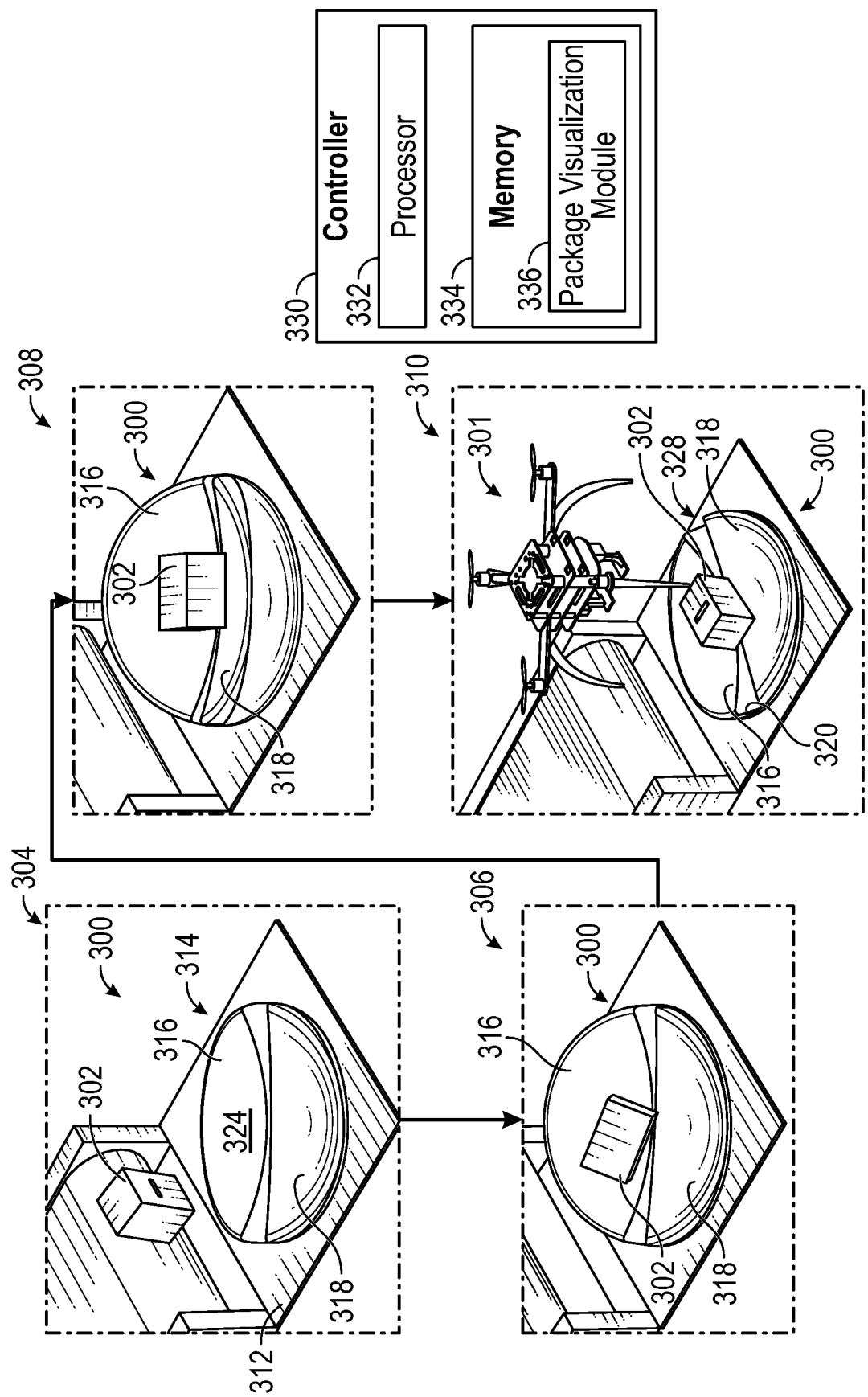
FIG. 5 illustrates another example apparatus of the present disclosure as well as another progressive sequence of package manipulations performed by the apparatus.

FIG. 5 illustrates another embodiment of an apparatus 300 that can be used to manipulate a package 302 into a desired orientation for pickup by a UAV 301. A sequence of manipulations is illustrated having sequence parts 304-310. In general, sequence part 304 illustrates the package 302 traversing down a conveyor to the apparatus 300.

The general components of the apparatus 300 are also illustrated in sequence part 304. In some embodiments, the apparatus 300 can comprise a platform 312 on a base 314. The platform 312 can generally rotate about the base 314 through any suitable means. In one or more embodiments, the platform 312 is bifurcated into two sections, such as a first section 316 and a second section 318. Broadly, the first section 316 and the second section 318 can hinge relative to one another to provide a clam-shell closing function. In one or more embodiments, the first section 316 can comprise a chamfered edge 320. Similarly the second section 318 can comprise a chamfered edge 322. When the first section 316 and the second section 318 hinge towards one another (as best illustrated in sequence part 308), the hinging movement is limited when the chamfered edge 320 of the first section 316 contacts the chamfered edge 322 of the second section 318. Single hinging of either the first section 316 or the second section 318 can be used to flip the package 302 as illustrated in sequence part 306. In this view, a substantially v-shaped groove 328 formed by chamfered edges 320 and 322 is illustrated. This v-shaped groove 328 closes down as the chamfered edges 320 and 322 are drawn together as the first section 316 and second section 318 hinge upwardly and inwardly towards one another.

In sequence part 308, the first section 316 and the second section 318 cooperatively hinge to one degree or another to reposition the package 302 for another flip operation or to center the package 302 for UAV pickup. Sequence part 308 illustrates the package 302 in a desired orientation for the UAV 301. According to some embodiments, the platform 312 has an upper surface 324 that is generally concave, which ensures that the package 118 remains on the platform 312 during manipulative operations.

As with the embodiments of FIGS. 1-4, the apparatus 300 also includes a controller 330 that is configured similarly to the controller 132 of FIG. 1. The controller 330 can comprise a processor 332 and a memory 334 that stores a package visualization module 336. Rather than being used to control the manipulating members described with respect to the apparatus of FIG. 1, the package visualization module 336 can be configured to evaluate images obtained by a camera (see FIG. 1) and utilize the same to determine a current orientation of the package 302 and manipulate the package 302 until a delivery label surface is facing upwards. In one or more embodiments, this can include performing a series of predetermined hinging, clasping, and/or rotation operations with the first section 316 and the second section 318. This series of predetermined operations can be created in a similar manner to the pattern illustrated in FIG. 3 but the manipulations required can be tailored to correspond to the structural components and capabilities of the apparatus 300.

Figure 6:
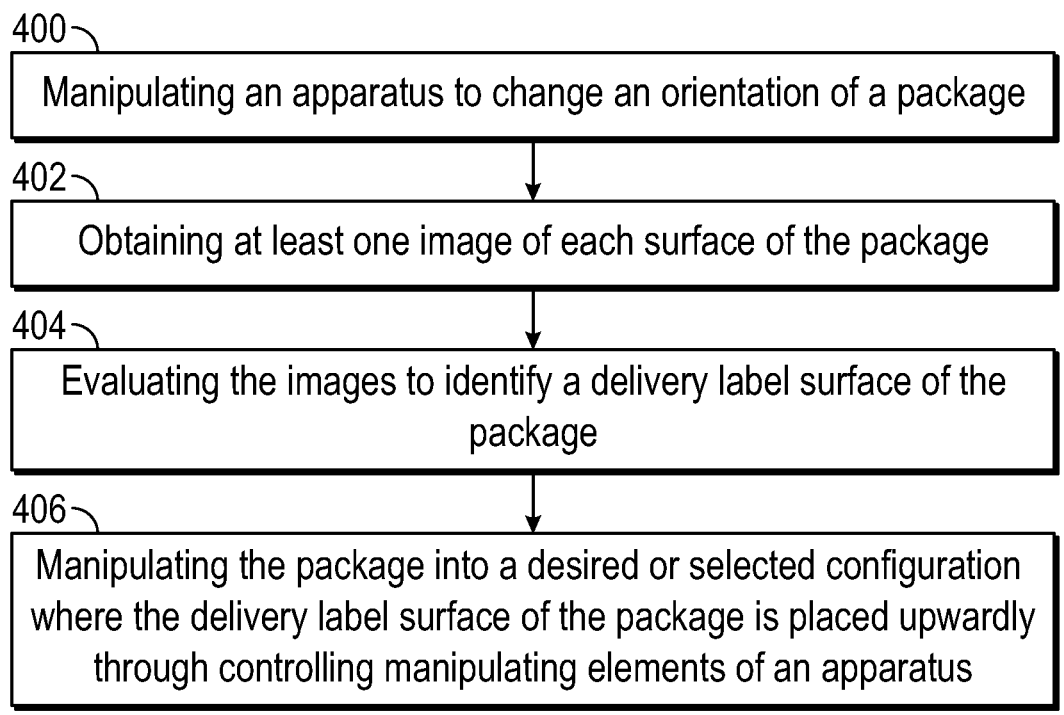
FIG. 6 is a flowchart of an example method of the present disclosure.

The following descriptions provide additional details on function and methodological aspects of the present disclosure provided through the architectures and/or systems disclosed above. FIG. 6 is a flowchart of an example method of the present disclosure. The method can be performed, for example, by a controller of the apparatus described above. The method includes a step 400 of manipulating an apparatus to change an orientation of a package. This step can be performed iteratively with another step 402 of obtaining at least one image of each surface of the package. Thus, steps 400 and 402 are performed until an image is obtained of each surface of the package. In another embodiment, steps 400 and 402 are performed until a delivery label surface of the package is identified. Thus, not all surfaces require imaging if the delivery label surface is found. For example, if the delivery label surface is found before all surfaces are imaged, there is no need to image the remaining surfaces.

The method can also include a step 404 of evaluating the images to identify a delivery label surface of the package. Once the delivery label surface of the package is identified, the method includes a step 406 of manipulating the package into a desired or selected configuration where the delivery label surface of the package is placed upwardly through controlling manipulating elements of an apparatus. Each embodiment of FIGS. 1-6, such as apparatus 106 and apparatus 300, each includes unique manipulating elements.

In some instances, indicia or other markings on the package, where each surface is augmented or embellished with a unique indicia, indicates a particular surface of the package. Knowing a current upward facing surface (based on indicia), the step 406 can include manipulating the package from its current known orientation to an orientation where the delivery label surface is upward facing. The controller and/or package visualization module can use an algorithm to determine the necessary manipulations needed to change the package's current known orientation to an orientation where the delivery label surface is upward facing.

Figure 7:
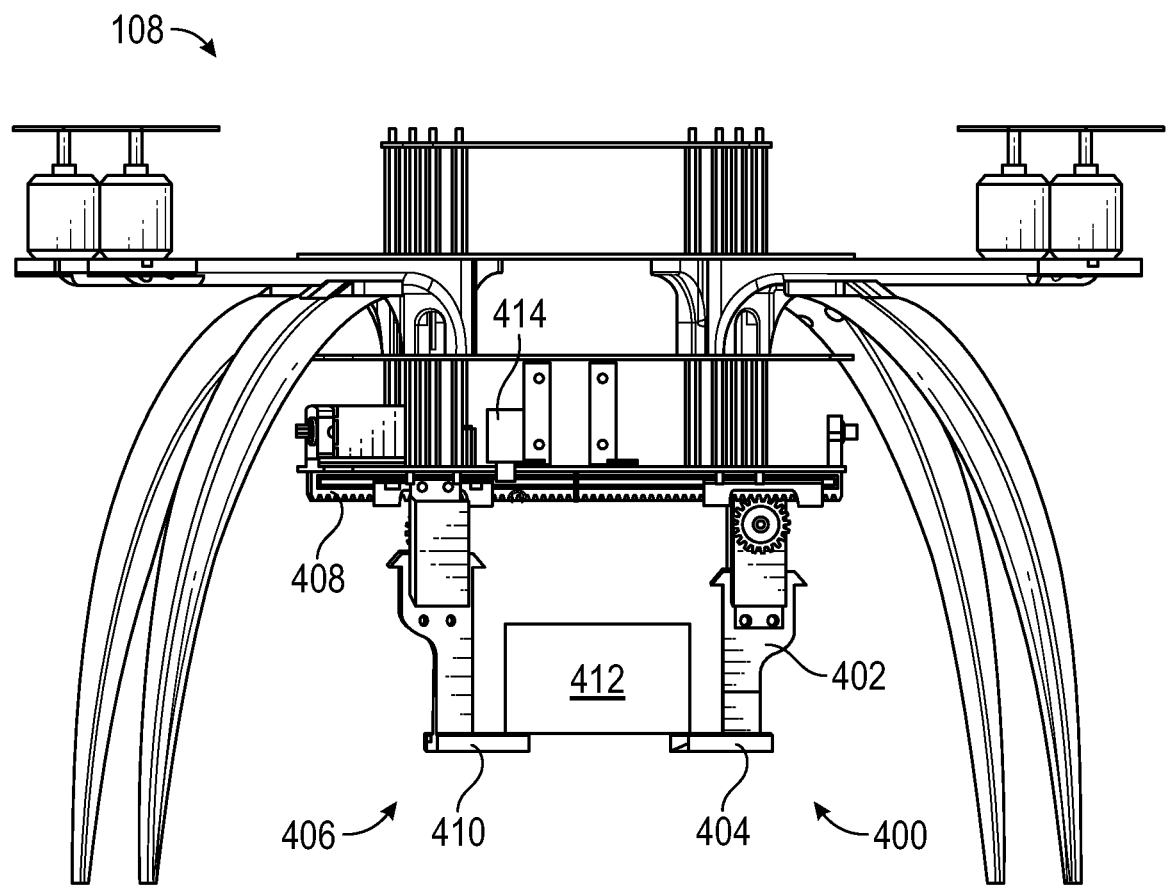
FIG. 7 is a perspective view of an example unmanned aerial vehicle constructed in accordance with some embodiments of the present disclosure.

FIG. 7 is a perspective view of an example UAV 108 of the present disclosure. The UAV 108 is configured to pick up the package off of the platform (of apparatus 106 or 300 of FIGS. 1-6) when the package is in the selected orientation. The UAV 108 uses a simple single degree of freedom mechanism to pick up and secure a package during delivery (e.g., single degree of freedom (DOF) payload assembly). The UAV 108 comprises a pair of package securement arm assemblies that cooperate to pick up the package. For example, a first securement arm assembly 400 comprises an arm body 402 and a support plate 404. A second securement arm assembly 406 is configured identically to the first securement arm assembly 400 with the exception that they are installed in mirrored orientation on a track assembly 408. This allows the support plate 404 of the first securement arm assembly 400 and a support plate 410 of the second securement arm assembly 406 to cradle a package 412.

According to some embodiments, the track assembly 408 comprises a gear track that is engaged by gears provided on each of the first securement arm assembly 400 and the second securement arm assembly 406. These gears can be turned by motors which are operated by a controller of the UAV 108.

The package securement arm assemblies can linearly translate along the track assembly 408 to widen or narrow a space between the first securement arm assembly 400 and the second securement arm assembly 406. This allows the UAV 108 to accommodate packages of varying dimensions.

In operation, when the UAV 108 is centered over the package 412, the first securement arm assembly 400 and the second securement arm assembly 406 are spaced apart to allow the UAV 108 to drop down over the package 412 without the support plate 404 and the support plate 410 interfering with the package 412. When the support plate 404 and the support plate 410 contact the platform of the apparatus (such as platform 124 of the apparatus 106 of FIGS. 2A and 2B), the first securement arm assembly 400 and the second securement arm assembly 406 are drawn together, and the support plate 404 and the support plate 410 cooperatively scoop up the package 412. This movement of the first securement arm assembly 400 and the second securement arm assembly 406 can be performed through the use of motors that are activated by a controller of the UAV 108. In general, the controller comprises a processor and memory. The memory stores logic that allows the UAV 108 to control operation of the pair of package securement arm assemblies. In some embodiments, the UAV 108 can include a camera 414. Images obtained by the camera 414 can be processed by the controller of the UAV 108 to determine a size of the package. The controller can then adjust a width between the pair of package securement arm assemblies to allow for pickup of the package.

EXAMPLES

In some instances, the following examples may be implemented together or separately by the systems and methods described herein.

Example 1 may include a system, comprising: a base; a platform rotatably supported on the base, the platform comprising at least one slot; an armature configured to protrude through the at least one slot when the at least one slot has been aligned with the armature through rotation of the base; a translating member that is configured to traverse above and across an upper surface of the platform; and a controller comprising at least one processor coupled to at least one memory, the controller being configured to place a package on the platform into a selected orientation through selective control of at least one of rotation of the platform, extension of the armature, translation of the translating member, or combinations thereof.

Example 2 may include the system according to example 1, wherein the armature is pivotally coupled to the base.

Example 3 may include the system according to example 1 and/or some other example herein, wherein the at least one slot comprises a plurality of slots that subdivide the platform into four sectors.

Example 4 may include the system according to example 1 and/or some other example herein, wherein the translating member comprises an elongated shaft that extends between posts of a rail assembly.

Example 5 may include the system according to example 1 and/or some other example herein, further comprising a camera that is configured to obtain images of the package, wherein the controller is configured to: manipulate the package so as to expose surfaces of the package to the camera; obtain images of the surfaces using the camera; and evaluate the images to locate a delivery tag on the package, wherein the package is continually manipulated and the images are obtained until a delivery tag of the package is identified on one of the surfaces.

Example 6 may include the system according to example 5 and/or some other example herein, wherein the selected orientation for the package is obtained by the controller further manipulating the package to place the surface comprising the delivery tag in an upward facing orientation so as to be visible to a camera of an unmanned aerial vehicle (UAV).

Example 7 may include the system according to example 1 and/or some other example herein, further comprising an elevator that vertically translates the base so as to operatively align the platform with each of a plurality of vertically stacked conveyors.

Example 8 may include the system according to example 1 and/or some other example herein, wherein the system is installed within a delivery vehicle that comprises a plurality of vertically stacked conveyors, the system further comprising an elevator that vertically translates the base so as to operatively align the platform with the plurality of vertically stacked conveyors.

Example 9 may include the system according to example 8 and/or some other example herein, wherein the elevator is further configured to elevate the package upwardly and outwardly from a roof of the delivery vehicle.

Example 10 may include a system, comprising: a base; a platform having a first section and a second section, the first section and the second section being hingedly coupled to one another to allow the first section and the second section to hinge inwardly towards one another; and a controller comprising at least one processor coupled to at least one memory, the controller being configured to place a package on the platform into a selected orientation through selective movement of at least one of the first section or the second section to manipulate the package into the selected orientation.

Example 11 may include the system according to example 10, wherein the platform is rotatably coupled to the base, wherein the controller is configured to rotate the platform in combination with a hinging movement of at least one of the first section or the second section.

Example 12 may include the system according to example 10 and/or some other example herein, wherein each of the first section and the second section comprises a beveled edge, wherein the beveled edges of the first section and the second section form a substantially v-shaped groove, wherein the beveled edges allow the first section and the second section to hinge into a v-shape during manipulation of the package.

Example 13 may include the system according to example 12 and/or some other example herein, wherein the controller is configured to manipulate the package so as to expose one or more surfaces of the package to a camera of an unmanned aerial vehicle (UAV), wherein the package is continually manipulated until a delivery tag of the package is identified and a surface comprising the delivery tag faces upwardly.

Example 14 may include the system according to example 10 and/or some other example herein, wherein the controller is configured to: manipulate the package so as to expose surfaces of the package to a camera; and evaluate images obtained by the camera to locate a delivery tag on the package, wherein the package is continually manipulated and the images are evaluated until a surface comprising a delivery tag is identified.

Example 15 may include the system according to example 10 and/or some other example herein, further comprising an elevator that vertically translates the base so as to operatively align the platform with each of a plurality of vertically stacked conveyors.

Example 16 may include the system according to example 10 and/or some other example herein, wherein the system is installed within a delivery vehicle, the system further comprising an elevator that vertically translates a platform that receives an unmanned aerial vehicle (UAV) so as to align the UAV with the package in the selected orientation.

Example 17 may include the system according to example 16 and/or some other example herein, wherein the elevator is further configured to elevate the UAV upwardly and outwardly from a roof of the delivery vehicle.

Example 18 may include the system according to example 10 and/or some other example herein, further comprising the UAV configured to pick up the package off of the platform when the package is in the selected orientation.

Example 19 may include the system according to example 18 and/or some other example herein, wherein the UAV comprises a pair of package securement arm assemblies that cooperate to pick up the package.

Example 20 may include the system according to example 19 and/or some other example herein, wherein the pair of package securement arm assemblies are configured to translate on a track assembly to increase a width of a space between the pair of package securement arm assemblies to accommodate packages of different sizes.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
    a base;
    a platform rotatably supported on the base, the platform comprising at least one slot;
    an armature configured to protrude through the at least one slot when the at least one slot has been aligned with the armature through rotation of the base;
    a translating member that is configured to traverse above and across an upper surface of the platform; and
    a controller comprising at least one processor coupled to at least one memory, the controller being configured to place a package on the platform into a selected orientation through selective control of at least one of rotation of the platform, extension of the armature, translation of the translating member, or combinations thereof.

2. The system according to claim 1, wherein the armature is pivotally coupled to the base.

3. The system according to claim 1, wherein the at least one slot comprises a plurality of slots that subdivide the platform into four sectors.

4. The system according to claim 1, wherein the translating member comprises an elongated shaft that extends between posts of a rail assembly.

5. The system according to claim 1, further comprising a camera that is configured to obtain images of the package, wherein the controller is configured to:
    manipulate the package so as to expose surfaces of the package to the camera;
    obtain images of the surfaces using the camera; and
    evaluate the images to locate a delivery tag on the package, wherein the package is continually manipulated and the images are obtained until a delivery tag of the package is identified on one of the surfaces.

6. The system according to claim 5, wherein the selected orientation for the package is obtained by the controller further manipulating the package to place the surface comprising the delivery tag in an upward facing orientation so as to be visible to a camera of an unmanned aerial vehicle (UAV).

7. The system according to claim 1, further comprising an elevator that vertically translates the base so as to operatively align the platform with each of a plurality of vertically stacked conveyors.

8. The system according to claim 1, wherein the system is installed within a delivery vehicle that comprises a plurality of vertically stacked conveyors, the system further comprising an elevator that vertically translates the base so as to operatively align the platform with the plurality of vertically stacked conveyors.

9. The system according to claim 8, wherein the elevator is further configured to elevate the package upwardly and outwardly from a roof of the delivery vehicle.

10. A system, comprising:
    a base;
    a platform having a first section and a second section, the first section and the second section being hingedly coupled to one another to allow the first section and the second section to hinge inwardly towards one another; and
    a controller comprising at least one processor coupled to at least one memory, the controller being configured to place a package on the platform into a selected orientation through selective movement of at least one of the first section or the second section to manipulate the package into the selected orientation.

11. The system according to claim 10, wherein the platform is rotatably coupled to the base, wherein the controller is configured to rotate the platform in combination with a hinging movement of at least one of the first section or the second section.

12. The system according to claim 10, wherein each of the first section and the second section comprises a beveled edge, wherein the beveled edges of the first section and the second section form a substantially v-shaped groove, wherein the beveled edges allow the first section and the second section to hinge into a v-shape during manipulation of the package.

13. The system according to claim 12, wherein the controller is configured to manipulate the package so as to expose one or more surfaces of the package to a camera of an unmanned aerial vehicle (UAV), wherein the package is continually manipulated until a delivery tag of the package is identified and a surface comprising the delivery tag faces upwardly.

14. The system according to claim 10, wherein the controller is configured to:
 manipulate the package so as to expose surfaces of the package to a camera; and
 evaluate images obtained by the camera to locate a delivery tag on the package, wherein the package is continually manipulated and the images are evaluated until a surface comprising a delivery tag is identified.

15. The system according to claim 10, further comprising an elevator that vertically translates the base so as to operatively align the platform with each of a plurality of vertically stacked conveyors.

16. The system according to claim 10, wherein the system is installed within a delivery vehicle, the system further comprising an elevator that vertically translates a platform that receives an unmanned aerial vehicle (UAV) so as to align the UAV with the package in the selected orientation.

17. The system according to claim 16, wherein the elevator is further configured to elevate the UAV upwardly and outwardly from a roof of the delivery vehicle.

18. The system according to claim 10, further comprising the UAV configured to pick up the package off of the platform when the package is in the selected orientation.

19. The system according to claim 18, wherein the UAV comprises a pair of package securement arm assemblies that cooperate to pick up the package.

20. The system according to claim 19, wherein the pair of package securement arm assemblies are configured to translate on a track assembly to increase a width of a space between the pair of package securement arm assemblies to accommodate packages of different sizes.

* * * * *